United States Patent [19]

Brizzolara

[11] 4,059,211

[45] Nov. 22, 1977

[54] WEB MATERIAL STORAGE DEVICE

[75] Inventor: Ernest E. Brizzolara, Rochester, N.Y.

[73] Assignee: Eastman Kodak Company, Rochester, N.Y.

[21] Appl. No.: 761,179

[22] Filed: Jan. 21, 1977

[51] Int. Cl.² .............................................. B65H 25/00
[52] U.S. Cl. ........................................ 226/11; 226/91; 226/110
[58] Field of Search ...................... 226/89, 91, 92, 110, 226/11, 118; 242/58, 58.1, 80

[56] References Cited

U.S. PATENT DOCUMENTS

| | | | |
|---|---|---|---|
| 2,449,234 | 9/1948 | Knoble | 242/80 X |
| 2,944,755 | 7/1960 | Foster | 242/80 |
| 3,863,532 | 2/1975 | Konno | 226/110 X |

Primary Examiner—Richard A. Schacher
Attorney, Agent, or Firm—D. R. Arndt

[57] ABSTRACT

A continuous web handling device includes two web storage structures, both of which can receive and discharge web material. A selector mechanism including a rotatable web guide turret directs the web material into a selected one of said structures and simultaneously directs the material previously stored in the other of said structures to be delivered therefrom.

2 Claims, 3 Drawing Figures

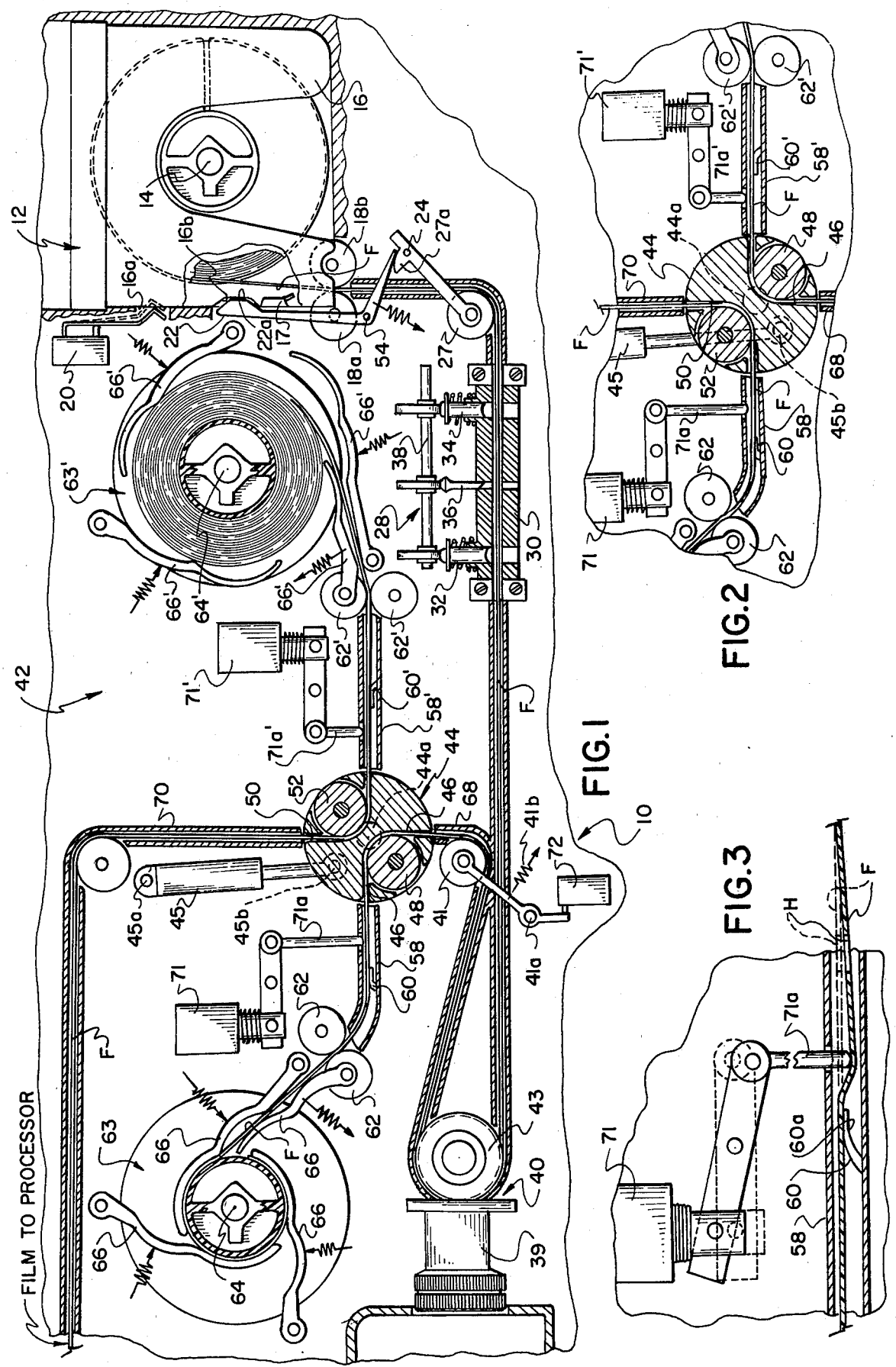

WEB MATERIAL STORAGE DEVICE

BACKGROUND OF THE INVENTION

1. Field of the Invention

The present invention relates to transient web material storage devices and more particularly such devices having the ability to simultaneously receive and deliver web material such as film. The device is particularly suited to those situations where there is a significant difference between the rate at which material is supplied and withdrawn.

2. Description of the Prior Art

It is known in the prior art to use a slack box for a transient film storage device. See for example commonly assigned U.S. Pat. No. 3,693,859, issued Sept. 26, 1972. The slack box stores film material at the feed and/or supply end of a continuously operating machine such as a photographic film processing machine. Use of the slack box permits intermittent stopping of the film transport for short periods of time without affecting the continuous operation of the processing device. A problem is encountered with the use of slack boxes when there is a significant difference between the rate at which film is fed into the boxes and the rate at which film is withdrawn from the boxes. When this is the case, the slack box must be relatively large to permit continuous operation of the processing machine.

Arrangements for exposing and processing film are well known. For instance, one system known to the prior art utilizes a separate camera and a separate processor to expose and process web material in the form of microfilm. The camera has a supply housing in which a roll of unexposed microfilm is positioned, an exposure station at which the microfilm is exposed, and a take-up housing in which the microfilm is stored after exposure. When it is desired to process the exposed microfilm, for instance at the end of a roll of microfilm, the take-up housing is opened and the roll of exposed microfilm is removed therefrom and transferred to a processing apparatus. The transfer operation either occurs under controlled light conditions or the exposed film is stored in a separate light-tight container. In either case, the operation of the camera is delayed for a period of time while the transfer occurs. Obviously, the film cannot be fed directly from the microfilm camera to the processing device because the rate at which film is exposed is substantially slower than the rate at which it is fed through the processing apparatus. In some situations, the filming of documents on microfilm is randomly intermittent, with intervals of hours or days between filming sessions. The delay that occurs between the time the film is loaded and processing of the roll begins often makes the earlier filmed documents inaccessible for an undesirably long period of time.

The resolution of this problem requires either the retention of the original documents, which militates against the purpose of microfilming, or requires the processing of partially exposed rolls of film, resulting in the possibility that the unexposed microfilm within the camera may be inadvertently exposed during transfer.

SUMMARY OF THE INVENTION

The aforementioned problems encountered when using known slack boxes or when transferring exposed microfilm from a camera to a processor are overcome by the present invention which provides a relatively compact transient film storage device that simultaneously stores film and supplies previously stored film. The improved film storage device of the present invention has first and second film storage means or structures, each of which can alternately receive and deliver film. A selector mechanism, including a rotatable turret operatively associated with these structures, simultaneously determines which of them receives film and which of them delivers previously stored film. The turret includes a first track for directing film from a source of supply to the selected one of the film handling structures, and a second track for directing previously stored film out of the other film handling structure. Accordingly, the present invention provides means for the quick, simple, and efficient transfer of exposed microfilm from a microfilm camera to a microfilm processor, thereby allowing for the simultaneous operation of the camera and processor with a minimum of inconvenience.

The invention and its features and advantages will be set forth and become more apparent in the detailed description of the preferred embodiment presented below.

BRIEF DESCRIPTION OF THE DRAWINGS

In the detailed description of the preferred embodiment presented below, reference is made to the accompanying drawings in which:

FIG. 1 is a schematic drawing of a microfilm camera incorporating the transient film storage device of the present invention;

FIG. 2 is a view of a portion of the apparatus of FIG. 1 showing an alternate position of the turret of the transient film storage device; and FIG. 3 is an enlarged view of a portion of the apparatus of FIG. 1 showing in more detail the strip retaining member that engages a hole in the trailing end of the film.

DESCRIPTION OF THE PREFERRED EMBODIMENT

Because transient film storage devices are well known, the present description will be directed in particular to elements forming part of, or cooperating more directly with, apparatus in accordance with the present invention. It is to be understood that elements not specifically shown or described may take various forms well known to those skilled in the art.

FIG. 1 illustrates an apparatus utilizing the present invention, such as a microfilm camera generally designated 10. The camera 10 has a housing, a portion of which is shown containing a supply compartment 12 with a spindle 14 for mounting a cartridge 16 containing a roll of unexposed film F.

One end wall 16a of the cartridge 16 has formed therein a hook tab 17 adapted to engage a hole (not shown) that is punched in the film F near its leading end. The hook tab 17 performs two functions. First, it locates and holds the leading end of the film F during shipment to prevent it from being pulled inside the cartridge 16, which might otherwise occur as a result of the clockspring action of the film even though the film core is prevented from rotating during shipment. Second, the hole H in the film F is punched at a fixed distance from the leading end of the film F so that when located on the hook, a predetermined length of film extends from the cartridge 16.

Upon insertion of the cartridge 16 into the supply compartment 12, the end wall of the cartridge 16a engages a cam surface 22a of a follower 22 causing it to pivot about pin 54 in a counterclockwise direction. A roller 18a carried by the follower 22 is thus caused to be separated from an associated drive roller 18b, thereby allowing the leading end of the film F to extend between the rollers. Roller 18b is driven by a motor (not shown) which is energized by the closing of a switch 20 as the cartridge is being inserted.

When the cartridge 16 is fully seated in compartment 12, cam surface 22a nests in a depression 16b on the end wall 16a of the cartridge 16, permitting follower 22 to be swung by its spring clockwise about its pivot 54 so that rollers 18a and 18b pinch the leading end of the film F. Thus, even though the drive rollers may commence rotation during insertion of the cartridge 16 into the supply chamber 12 as a result of the closure of switch 20, actual driving of the film will not occur until the cartridge 16 is fully seated and cam surface 22a nests in depression 16b allowing the rollers 18a and 18b to pinch the film F therebetween for positive film drive.

When switch 20 is closed and the film drive rollers 18a and 18b are in pinching engagement with the film, the film is pulled free of the hook tab 17 and withdrawn from the cartridge 16 and is directed along a film supply track 68. This track directs the film around a sensing idler roller 27 and through a punch/knife mechanism generally designated 28 (to be discussed later), beyond which the film passes through an exposure station 40 having a lens 39 that directs an image on the film F as the latter passes around platen roller 43. When the leading end of the film F reaches platen roller 43, which is a driven roller, film drive is assumed by the latter. Roller 43 is driven at a higher peripheral speed than rollers 18a and 18b, so that the film is momentarily tensioned between roller 43 and rollers 18a and 18b. This tension in the film causes sensing roller 27 to pivot about pivot pin 24, which causes cam and latch surface 27a to deflect follower 22 in a counterclockwise direction about pivot pin 54 to separate roller 18a from roller 18b and to latch roller 18a in its ineffective position. Accordingly, rollers 18a and 18b remain out of driving engagement with the film once the leading end of the film is engaged by roller 43. Beyond roller 43, the film is guided around a sensing roller 41 to a film handling structure, generally designated 42.

The film handling structure 42 is comprised of a directing means such as rotatable turret 44 and two film storage means generally designated 63 and 63', respectively, which are illustrated as rotatable winding cores 64 and 64'. Turret 44 defines a first film track 46 operatively associated with an idler roller 48 and a second film track 50 associated with an idler roller 52.

The turret 44 is supported for rotational movement by a shaft 44a and is connected to an indexing mechanism, illustrated as an air cylinder 45 supported at one end by link pin 45a. The other end of the cylinder 45 is attached to pin 45b on the back side of the turret 44 thereby allowing for the selective rotation of the turret through a 90° angle between the two positions shown in FIGS. 1 and 2. When in the FIG. 1 position, track 46 on turret 44 is operatively associated with a film track 58 leading to storage means 63 while track 50 will be associated with a similar track 58' to storage means 63'.

Drive rollers 62 are positioned at the entrance to storage means 63, which includes a rotatable winding core 64 for receiving film F and means such as spring biased fingers 66 which direct the leading end of the film to core 64 and control the buildup of film in storage means 63. Tendency drive means, not shown, (such as a motor) is provided for rotating core 64 so as to maintain tension in the film F. Because web storage means 63' is similar to storage means 63, the same numbers, with primes attached, have been used to identify corresponding components, which operate in the same manner.

During normal operation with the turret in the FIG. 1 position, the film F is being driven by platen roller 43 with roller 41 sensing the tension of the film as it passes through the turret 44 to the storage means 63 where the tendency drive of core 64 maintains film tension and eliminates slack as the film is wound on the core 64. While the film F is being stored in compartment 63, with the turret in the position shown in FIG. 1, previously stored film F may be fed, by rollers 62', along track 58' and, by way of turret film track 50, to a film track 70 and thence to a processing station, not shown.

Upon either the exhaustion of the film in the cartridge 16 or the actuation of the punch/knife mechanism 28, the trailing end of the film F will pass beyond platen roller 43 under the influence of the drive rollers 62. Loss of film drive by the platen roller 43 and the accompanying absence of film tension will be sensed by roller 41, which will move in a clockwise direction about pivot pin 41a under the influence of spring 41b, to close switch 72 and thereby actuate a solenoid 71. This actuation of solenoid 71 in turn, causes a bifurcated deflecting finger 71a to be directed into the film track 58 where it engages both edges of the film and deflects the film toward the opposite wall of the track just ahead of a hook 60 extending into the track, thereby insuring that the barb 60a of the hook 60 will engage the punched hole H near the end of the film to prevent the end of the film F from entering the storage means 63. With such an arrangement it can be readily seen that subsequent rotation of the drive rollers 62 in the opposite direction will cause the film to disengage from hook 60 and be driven from the storage compartment 63.

Referring now to FIG. 2, the alternate or second position of turret 44 is illustrated. Turret 44 has been rotated so that film track 46 now connects storage means 63' with film track 68 and film track 50 connects storage means 63 with film track 70. Thus, storage means 63 is ready to furnish previously stored film F to film track 70 while storage means 63' is ready to receive film F. Accordingly, it will be apparent that the rotational position of the turret determines which of the film storage means receives film and automatically allows the other film storage means to discharge film.

Punch/knife mechanism 28, which is used to simultaneously cut the film F and to punch holes on either side of the cut is not essential to the operation of the device, inasmuch as the film supplied in the cartridge 16 contains pre-punched holes in both the leading and trailing ends of the film F. However, use of the punch/knife mechanism 28 can increase the versatility of the device by allowing partially exposed rolls of film to be removed from the machine for processing while leaving the balance of the film left on the roll for a later filming session. Such a procedure will make the documents recorded on the film accessible as soon as the film has been processed. Another benefit derived by using the punch/knife mechanism 28 is that bulk rolls of film may be used containing three to four times the capacity of the storage compartments 63 and 63' so that each of the compartments may be filled or partially filled several times for each loading of the supply magazine 16. Purchasing of the film in bulk has been found to be more economical while at the same time reducing the number of times the machine has to be loaded with film.

The mechanism 28 has a housing 30, spring-biased punches 32, 34, knife 36 and cam shaft 38. By the actuation of a switch or other suitable means, a motor (not shown) rotates cam shaft 38, thereby causing simultaneous cutting of the film F and punching of holes in both the trailing end of the severed film and the leading end of the film remaining in the film cartridge. After cutting and punching, the severed film is advanced by the platen roller 43 into one of the storage means 63, 63' and hooked in place for subsequent delivery out of the film handling structure. When it is desired to resume filming after a cutting and punching operation, it is necessary that drive rollers 18a and 18b be once again closed to provide film drive; this can be done either manually or automatically by returning roller 27 to the position shown in FIG. 1. As described earlier, once film drive is furnished by drive rollers 18a and 18b, the leading end of the film is directed along the film supply track 68 until the film driving function is assumed by platen roller 43.

The invention has been described in detail with particular reference to a preferred embodiment thereof, but it will be understood that variations and modifications can be effected within the spirit and scope of the invention. For example, it is contemplated that the storage means containing spindles upon which the film is wound could be replaced by vacuum chambers and the film could be stored in a layered arrangement rather than being in wound configuration.

I claim:

1. A film handling and directing device intended to be interposed between a first guide track and a second guide track; said device comprising:
   a plurality of storage means, each of said storage means being adapted to receive and store film and then to supply the previously stored film; and
   a rotatable turret having a first and a second track, one of said tracks directing web material into one of said storage means while the other of said tracks simultaneously directs web material out of another of said storage means.

2. A web handling device comprising:
   web supply and exit paths;
   first and second web storage means;
   first guide means;
   second guide means; and
   means for selectively connecting said guide means to said storage means, said connecting means being movable between:
      a first position wherein said first guide means is operatively associated with said first storage means and said supply path and said second guide means is operatively associated with said second storage means and said exit path; and
      a second position wherein said first guide means is operatively associated with said second storage means and said supply path and said second guide means is operatively associated with said first storage means and said exit path.

* * * * *